United States Patent [19]

Hashimoto et al.

[11] Patent Number: 4,832,313
[45] Date of Patent: May 23, 1989

[54] SOLENOID VALVE

[75] Inventors: Kenji Hashimoto, Toyota; Yasushi Miura, Nagoya, both of Japan

[73] Assignee: Aisin Seiki Kabushiki Kaisha, Japan

[21] Appl. No.: 102,331

[22] Filed: Sep. 29, 1987

[30] Foreign Application Priority Data

Sep. 30, 1986 [JP] Japan .......................... 61-148892[U]

[51] Int. Cl.⁴ ............................................. F16K 31/06
[52] U.S. Cl. ........................... 251/129.07; 251/129.17
[58] Field of Search ....................... 251/129.07, 129.17

[56] References Cited

U.S. PATENT DOCUMENTS 4,210,311 7/1980 Stone ............................... 251/129.07
4,411,406 10/1983 Inada et al. ..................... 251/129.07

FOREIGN PATENT DOCUMENTS 50-100132 8/1975 Japan .

Primary Examiner—Arnold Rosenthal
Attorney, Agent, or Firm—Finnegan, Henderson, Farabow, Garrett & Dunner

[57] ABSTRACT

A solenoid valve comprises a housing including an inlet port for fluid communication with a positive pressure source and an outlet port for fluid communication with a negative pressure source; a passage for fluid communication between the inlet port and the outlet port; and an axially bi-directional solenoid-actuated valve in the housing for opening and closing the passage, including an electromagnetically movable valve member having a sealing area exposed to the negative pressure from the outlet port when the valve means is in the closed position; and a diaphragm defining a back pressure chamber in fluid communication with the passage for offsetting the effect of the negative pressure on the exposed sealing area and reducing the electromagnetic force required to move the valve member.

3 Claims, 1 Drawing Sheet

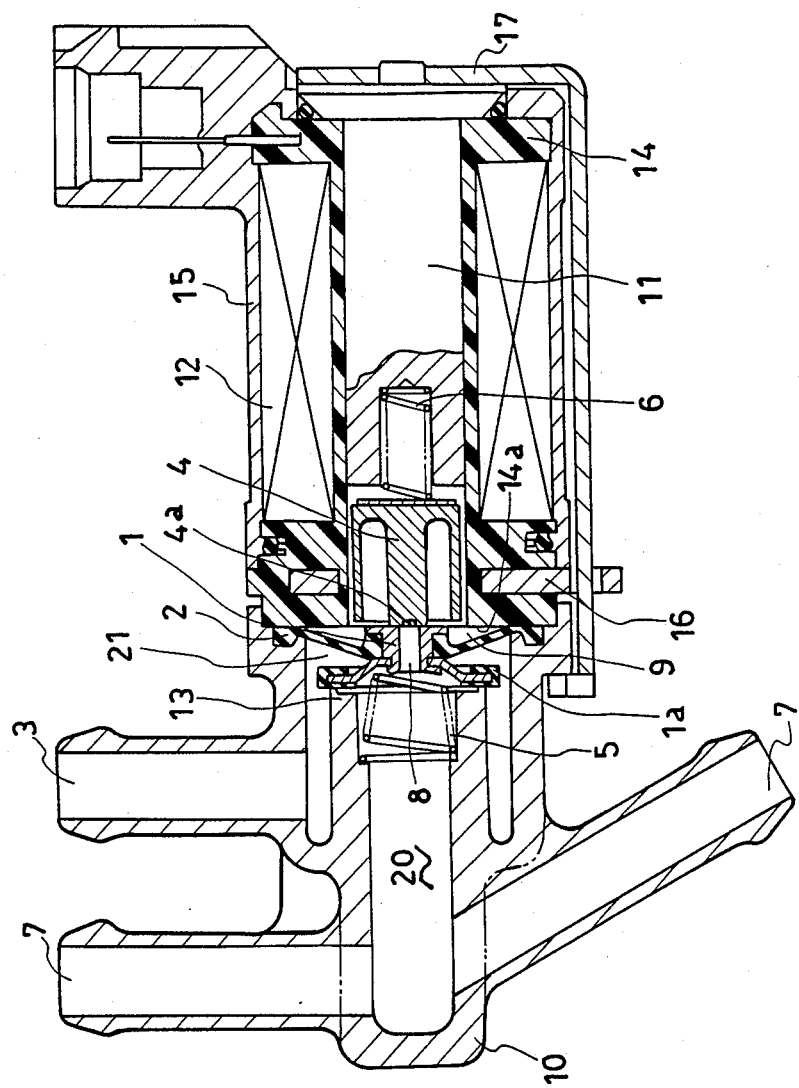

SOLENOID VALVE

BACKGROUND OF THE INVENTION

1. Field of the Invention

This invention relates to a solenoid valve and more particularly to a solenoid valve for controlling an actuator by switching over the supply of pressure thereto.

2. Statement of Prior Art

One conventional type solenoid valve is shown in a Japanese utility model application laid open on Aug. 19, 1975 as JitsuKai sho-50-100132. The necessary amount of the electro-magnetic force for moving the valve is provided by a solenoid coil. Accordingly, when the fluid flow is very large, the amount of the electro-magnetic force must be larger for moving the valve. This requires that the solenoid coil be made larger to overcome the fluid pressure at the valve. However, when the valve is in its closed position, a large force is needed for holding the valve closed. In addition, it is necessary to provide a large effective sealing area when a large amount of fluid flows therethrough. Thus, it is also necessary to provide a larger solenoid coil for overcoming the pressure difference generated at the valve.

SUMMARY OF THE INVENTION

It is therefore an object of the present invention to provide an improved solenoid valve which can obviate the above conventional drawbacks.

It is another object of the present invention to provide an improved solenoid valve which can be used for controlling relatively large amounts of fluid flow through the valve.

It is further object of the invention to provide an improved solenoid valve which is compact and inexpensive.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the above objects and advantages, and in accordance with the purpose of the invention, as embodied and broadly described herein, the solenoid valve of this invention comprises a housing including an inlet port for fluid communication with a positive pressure source and an outlet port for fluid communication with a negative pressure source; a passage for providing fluid communication between the inlet port and the outlet port; and a bidirectional, solenoid-actuated valve means in the housing for opening and closing the passage means. The valve means includes an electromagnetically movable valve member having a defined sealing area exposed to the negative pressure from the outlet port when the valve means is in the closed position; and a diaphragm including a resilient member sealed within the housing and defining a back pressure chamber in fluid communication with the outlet port when the valve member is the closed position, the resilient member having an effective area on each side thereof substantially equal to the defined sealing area of the valve member for offsetting the effect of the negative pressure on the defined sealing area and reducing the electromagnetic force required to open the passage.

It is preferred that the valve member include a core having an outer face and the diaphragm means include a resilient member sealed in the housing. The back pressure chamber is defined between the resilient member and the outer face. It is also preferred that the diaphragm means include an axial passage through the resilient member and a groove in the outer face, the axial passage and the groove being connected for communicating between the outlet port and the back pressure chamber.

The valve means also may include a valve spring for biasing the valve member in one direction and a return spring for biasing the valve member in the other direction, the valve spring having a resilient force less than the resilient force of the return spring.

BRIEF DESCRIPTION OF THE DRAWING

These and further objects of the invention will become more apparent from the following description when taken in conjunction with the accompanying drawing. The sole FIGURE is a cross sectional view of the preferred embodiment of the invention.

DESCRIPTION OF THE PREFERRED EMBODIMENT

Reference will now be made in detail to the present preferred embodiment, an example of which is illustrated in the accompanying drawing.

In accordance with the invention, the solenoid valve comprises, a housing including an inlet port for fluid communication with a positive pressure source and an outlet port for fluid communication with a negative pressure source. Passage means are provided for fluid communication between the inlet port and the outlet port. Axially bi-directional solenoid-actuated valve means are disposed in the housing for opening and closing the passage means, including an electromagnetically movable valve member having a sealing area exposed to the negative pressure from the outlet port when the valve means is in the closed position; and diaphragm means defining a back pressure chamber in fluid communication with the passage means for offsetting the effect of the negative pressure on the exposed sealing area and reducing the electromagnetic force required to move the valve member.

Referring now to the illustrated embodiment, a solenoid coil 12 is wound around the periphery of a bobbin 14 and is disposed in a casing 15 in an axial direction. A valve core 11 is disposed in the central hole of the solenoid coil 12.

A magnetic circuit is formed by the solenoid coil 12, casing 15 and yoke 16 upon energization of the solenoid coil 12. A movable core 4 is disposed in the magnetic circuit and is movable axially, bi-directionally upon energization and deenergization of the solenoid coil. An outer yoke member 17 is secured to the casing 15. The valve core 11 is secured to the casing 15 and positioned next to the movable core 4 facing one end thereof. A valve member 1 is disposed in a housing 10 between inlet port 3 and two outlet ports 7. The inlet port 3 is exposed to the atmosphere and the outlet ports 7 typically are connected to a negative pressure source, such as an engine intake manifold. The valve member 1 includes a valve seal 1a, which is in contact with a valve seat 13 provided in the housing 10. A diaphragm 2 having an outer periphery secured to the housing, is disposed between the housing and one end surface 14a of the bobbin member 14. A central bore 8 is connected to a groove 4a provided on one end surface of the movable core 4.

A valve spring 5 is disposed in a chamber 20 for biasing the valve member 1 in the right direction as oriented in the drawing. The chamber 20 is connected to the outlet ports 7. The valve seal 1a is seated on the seat 13 by the force of a return spring 6, disposed between the valve core 11 and the movable core 4. Numeral 21 is a pressure chamber communicating with the inlet port 3, and is communicable with the chamber 20 when the valve seal 1a is separated from the valve seat 13. A back pressure chamber 9 is defined by the diaphragm 2, a left end surface 14a of the bobbin member 14 and an outside end surface 4b of the movable core 4.

When a negative pressure is introduced from one of the outlet ports 7, the valve member 1 receives force defined by the effective area of the seal 1a times the negative pressure in the left direction as viewed in the drawing. The negative pressure also is applied to the back pressure chamber 9 through central hole 8 and the groove 4a. The diaphragm 2 receives force defined by the effective area of the diaphragm 2 times the negative pressure in the right direction as viewed in the drawing. Since the effective areas of the seal 1a and the diaphragm 2 are designed to be same, there will be substantially no force exerted on the valve member 1. Only the force difference between the springs 5 and 6 is applied at the valve member and the necessary force to move the valve member 1 is very small, i.e., the difference in force between the springs 5 and 6. This structure allows reduction of the size of the solenoid coil and corresponding reduction in the weight and the cost of the valve.

Further, the seal 1a and the diaphragm 2 may be integrally formed to fix the mutual operative positions.

It will be apparent to those skilled in the art that the solenoid valve of this invention may be constructed in a variety of ways without departing from the spirit and scope of the appended claims.

What is claimed is:

1. A solenoid valve comprising:
a housing including an inlet port for fluid communication with a positive pressure source and an outlet port for fluid communication with a negative pressure source;
a passage for providing fluid communication between the inlet port and the outlet port; and
a bi-directional, solenoid-actuated valve means in the housing for opening and closing the passage, said valve means including an electromagnetically movable valve member having a defined sealing area exposed to the negative pressure from the outlet port when the valve means is in the closed position, said valve member including a core having an outer face, and a groove in the outer face; a diaphragm including a resilient member sealed within the housing and defining between the resilient member and the outer face a back pressure chamber in fluid communication with the outlet port when the valve member is in the closed position, and an axial passage formed through the resilient member, the axial passage and the groove being connected to provide said fluid communication between the outlet port and the back pressure chamber, the resilient member having an effective area on each side thereof substantially equal to the defined sealing area of the valve member for offsetting the effect of the negative pressure on the defined sealing area and reducing the electromagnetic force required to open the passage; and a valve spring for biasing the valve member in one direction and a return spring for biasing the valve member in the other direction, the valve spring having a resilient force less than the resilient force of the return spring.

2. The valve of claim 1 wherein the valve member also includes a valve seal and the housing includes a valve seat, the resilient member being disposed between the valve seal and the core.

3. A solenoid valve comprising:
a housing including an inlet port for fluid communication with a negative pressure source and an outlet port for fluid communication with a positive pressure source;
a passage for providing fluid communication between the inlet port and the outlet port; and
a bi-directional, solenoid-actuated valve means in the housing for opening and closing the passage, said valve means including an electromagnetically movable valve member having a defined sealing area exposed to the positive pressure from the outlet port when the valve means is in the closed position, said valve member including a core having an outer face, and a groove in the outer face; a diaphragm including a resilient member sealed within the housing and defining between the resilient member and the outer face a back pressure chamber in fluid communication with the outlet port when the valve member is in the closed position, and an axial passage formed through the resilient member, the axial passage and the groove being connected to provide said fluid communication between the outlet port and the back pressure chamber, the resilient member having an effective area on each side thereof substantially equal to the defined sealing area of the valve member for offsetting the effect of the positive pressure on the defined sealing area and reducing the electromagnetic force required to open the passage; and a valve spring for biasing the valve member in one direction and a return spring for biasing the valve member in the other direction, the valve spring having a resilient force less than the resilient force of the return spring.

* * * * *